INVENTOR.
Fred E. Bachman

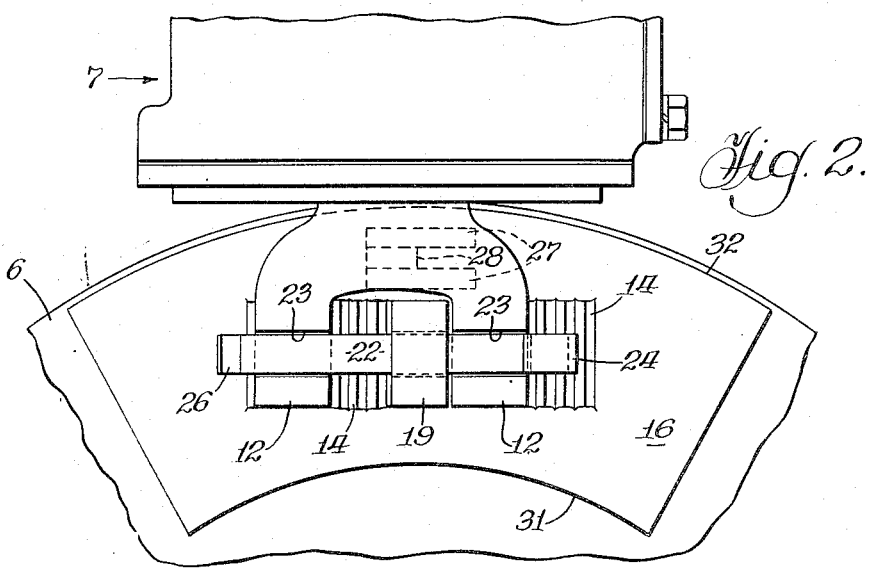
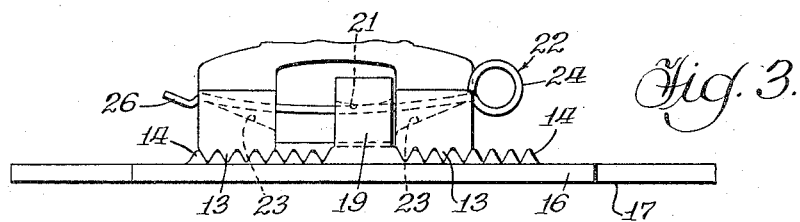
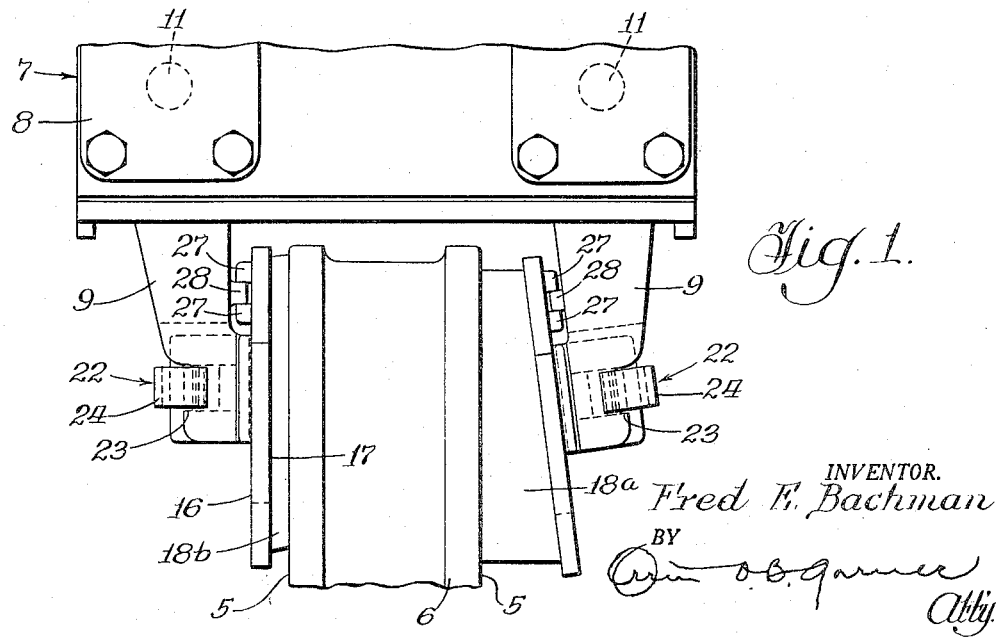
INVENTOR.
Fred E. Bachman

Jan. 15, 1957 F. E. BACHMAN 2,777,540
BRAKE HEAD MOUNTING ARRANGEMENT
Filed Jan. 12, 1951 3 Sheets-Sheet 3

INVENTOR.
Fred F. Bachman
BY
Orrin B Garner
Atty.

United States Patent Office 2,777,540
Patented Jan. 15, 1957

2,777,540

BRAKE HEAD MOUNTING ARRANGEMENT

Fred E. Bachman, St. Louis, Mo., assignor to American Steel Foundries, Chicago, Ill., a corporation of New Jersey Application January 12, 1951, Serial No. 205,710

6 Claims. (Cl. 188—73)

This invention relates to railway brake equipment and is more particularly concerned with the provision of a novel off-wheel-tread brake arrangement in which braking means are provided for decelerating one or more disks or rotors associated with the wheel and axle assemblies of a railway car truck.

The present invention contemplates the provision of an off-wheel-tread brake arrangement in which brake disks are supported to rotate with each wheel and axle assembly, a brake frame being carried by the truck frame adjacent each disk, and each brake frame supporting a pair of levers with brake shoes for frictional engagement with opposite sides of the adjacent disk.

This invention further contemplates the provision of an off-wheel-tread brake arrangement in which a brake shoe is secured in fixed position upon the end of each brake lever.

This invention further contemplates the provision of an off-wheel-tread brake arrangement in which a wedge-shaped brake shoe is secured to each brake head, the thickest portion of the brake shoe being disposed nearest the axis of rotation of the disk and adapted to exert the greatest pressure against the side of the disk to compensate for the faster speed of the disk at the outer periphery of the shoe to thus equalize wear on the friction faces.

The present invention further contemplates the provision of an off-wheel-tread brake arrangement in which the brake head may be adjustably positioned transversely of its supporting lever in order to properly position the brake head with respect to the face of the disk.

This invention further contemplates the provision of means for adjustably positioning the brake head transversely along the outer end of its lever, said means being operable to prevent tilting movement of the brake head relative to the lever in order that the brake shoe may apply its greatest pressure along its inner periphery when engaged against a brake disk.

This invention embodies other novel features, details of construction and arrangement of parts which are hereafter set forth in the specification and claims and illustrated in the accompanying drawings, wherein:

Figure 1 is a top plan view illustrating an off-wheel-tread brake arrangement embodying features of the present invention.

Figure 2 is a side elevational view of same.

Figure 3 is a fragmentary detail end elevational view illustrating the means employed for detachably and adjustably connecting the brake head to the end of a lever.

Figure 5:
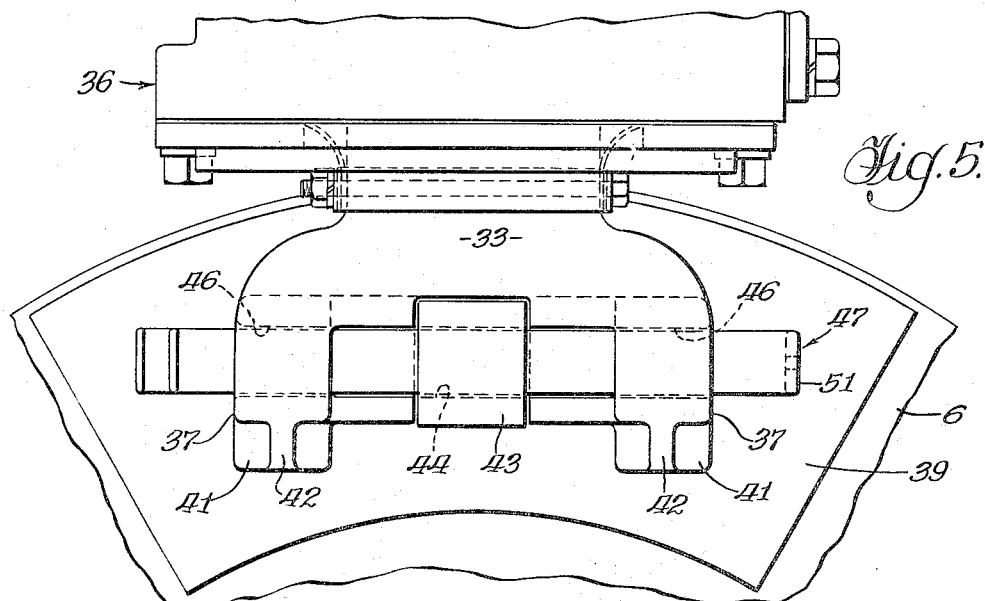
Figure 5 is a side elevational view of same.

Referring now to the drawings for a better understanding of the present invention, and more particularly to Figures 1, 2 and 3 therein, the off-wheel-tread brake arrangement is shown as comprising a rotor or disk 6 which is secured by stud and nut assemblies to the inner side of a wheel (not shown), the disk and wheel being journaled for rotational movement about a common axis. The braking means for the disk comprises a brake frame, generally indicated at 7, having a body portion 8 in the form of a cylindrical housing disposed adjacent the outer periphery of the disk 6. A pair of levers 9—9 are mounted for pivotal movement at 11—11 within the housing 8 and project through apertures provided in the forward end of the housing at opposite sides of the disk 6. The outer end of each lever 9 is bifurcated to provide a pair of arms 12—12 disposed in spaced parallel relation. The inner face of each arm 12 is corrugated longitudinally at 13—13 for meshing engagement with corrugations 14 formed on the outer face of a brake head 16.

Each brake head 16 is preferably formed with a flat inner surface 17 to receive and engage a brake shoe 18 which may be formed from any suitable friction material and secured to the brake head by means of rivets and cement. A boss 19 is provided on the outer face of the brake head and is formed with an aperture 21 to receive a spring key 22. The spring key 22 is shown as comprising a length of resilient spring steel having its medial portion engaged within the aperture 21 of the boss 19 and its ends engaged within recesses 23—23 formed in the outer surfaces of the arms 12—12. The spring key 22 is engaged against longitudinal displacement by means of an eye 24 formed on one end thereof and an offset portion 26 formed on its other end. The outer face of the brake head is also provided with a pair of lugs 27—27 disposed in spaced parallel relation to receive a tongue 28 formed on the inner side of the lever 9.

As illustrated in Figure 1, a new brake shoe 18a applied to a brake head is wedge-shaped in cross section and gradually becomes worn away by engagement against the friction faces 5—5 provided on opposite sides of the disk 6. When a brake shoe has become completely worn the opposite faces thereof are substantially parallel, as illustrated at 18b in Figure 1. The brake levers 9—9 are actuated to move the brake heads 16—16 toward opposite sides of the disk 6 by any suitable conventional power means such as an air cylinder (not shown) mounted within the housing 8.

In the manufacture of the brake levers 9 and brake heads 16, the corrugated surfaces 13 and 14 formed thereon should cover a sufficient area to prevent tilting movement of a brake head relative to its brake lever when a brake shoe is applied against the friction face 5 of the disk 6. By securing the brake head against tilting movement relative to its lever it is thus possible to apply the greatest pressure at the inner periphery of the brake shoe to compensate for the faster speed of the disk at the outer periphery of the shoe to thus equalize wear on the coacting friction faces. In other forms of off-wheel brake arrangements, it has heretofore been the practice to mount a brake head for pivotal movement upon the end of a brake lever, and then to employ the use of guide means to direct the brake head toward and away from the friction face of the rotor. Due to the relatively greater surface speed of the disk adjacent the outer periphery of the brake shoe, it will be appreciated that a pivotal connection between the brake head and the brake lever permits greatest wear on the brake shoe adjacent its outer periphery. By providing a fixed connection between the brake head 16 and a brake lever 9, it is possible to apply the greatest pressure to the inner peripheral portion of the brake shoe to compensate for the faster speed of the disk adjacent the outer peirphery of the brake shoe.

As illustrated in Figure 2, the brake head 16 and its brake shoe 18 are formed with arcuate inner and outer peripheries 31 and 32, respectively, defining arcs concentric with the disk 6. In the operation of the brake, it is essential that the entire friction face of the brake shoe should be disposed against a friction face 5 of the disk and within the periphery of the disk in order that the entire working surface of the brake shoe shall be operable. In mounting a brake head upon the end of a brake lever it is necessary to properly locate the brake head with respect to the axis of rotation of the disk 6 to dispose all portions of the brake shoe face in position to engage a friction face of the disk 6. By providing a series of corrugations 14 along the outer face of the brake head it will be observed that the brake head may be adjusted transversely of the lever arms 12—12 to locate all portions of the brake shoe within the periphery of the disk 6. The spring key 22 is then inserted through the aperture 21 in the boss 19 to draw the brake head 16 into tight fixed engagement against the corrugated surface 13 formed on the inner faces of the arms 12—12.

Figure 6:
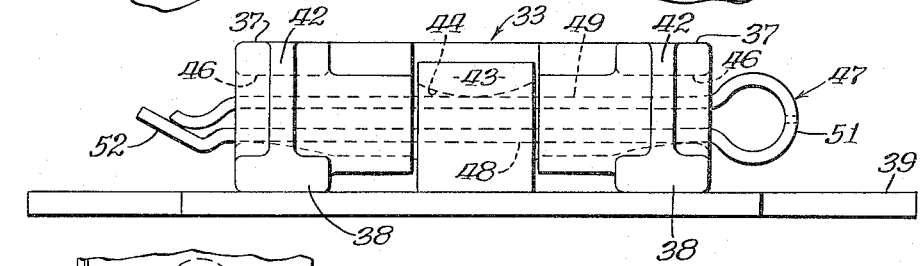
Figure 6 is an end elevational view showing the means for detachably connecting the brake head to the end of its lever.
Figure 4:
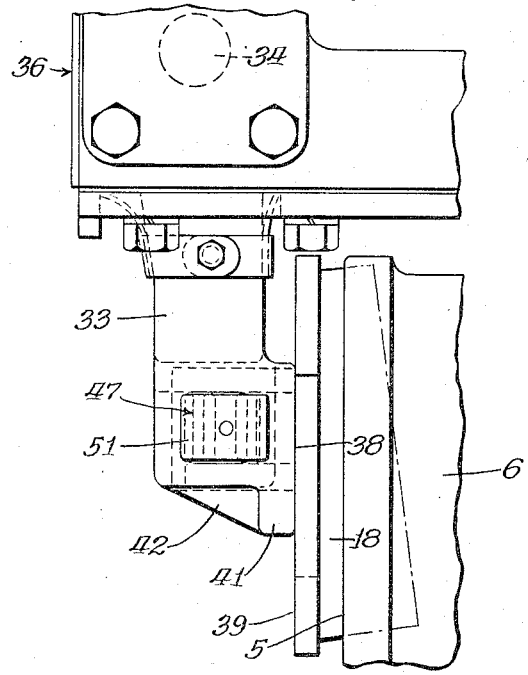
Figure 4 is a top plan view illustrating a modified form of the present invention.

Figures 4, 5 and 6 in the drawings illustrate a modified form of the present invention in which a brake lever 33 is mounted for pivotal movement at 34 in a brake frame housing 36. The outer end of the brake lever 33 is bifurcated to provide a pair of arms 37—37 formed with pads 38—38 for flush abutting engagement against the outer surface of a brake head 39. To increase the surface area of the pads 38—38, flanges 41—41 are formed on the forward ends of the arms 37—37, the flanges being reinforced by means of ribs 42—42.

The brake head 39 is provided with a boss 43 formed with an aperture 44 in registry with apertures 46—46 formed in the arms 37—37. The brake head 39 is tightly engaged against the pads 38—38 by means of a spring key 47. The spring key 47 comprises a strip of resilient spring metal bent intermediate its ends to provide a pair of legs 48—49 and a connecting loop portion 51. The free end of the leg 48 is offset laterally at 52 for engagement against the free end of the leg 49 to hold said legs in spaced relation intermediate their ends. A brake shoe 18 of the type heretofore described is secured to the inner face of the brake head 39 by means of rivets and cement.

In the form of the invention thus shown and described, the brake lever 33 is pivoted about the pivot connection 34 by any suitable power means (not shown) to cause the brake shoe 18 to move into frictional engagement against the friction face 5 of a rotatable disk 6. During engagement of the brake shoe against the disk it will be noted that the relatively large pads 38—38 and the spring key 47 co-act to prevent tilting movement of the brake head 39 relative to the brake lever 33. The portion of the brake shoe 18 nearest the axis of rotation of the disk 6 thus acts to exert greater pressure against the disk than the portion of the brake shoe disposed adjacent the periphery of the disk, thus insuring substantially equal wear of the brake shoe throughout its working face. In this form of the invention it will also be noted that the brake shoe 39 is not adjustable transversely of the brake lever 33.

Figure 8:
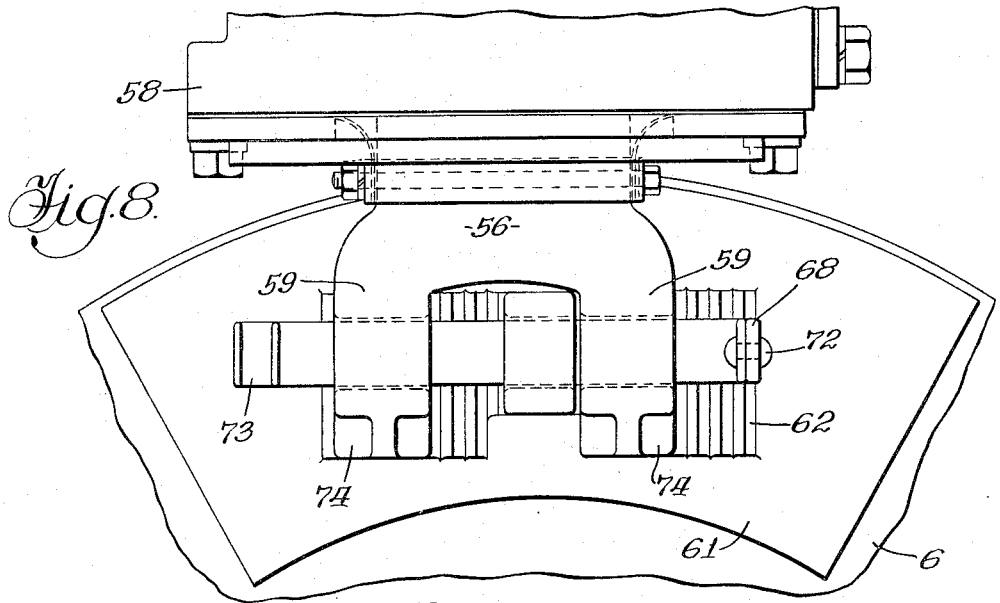
Figure 8 is a side elevational view of same.
Figure 9:
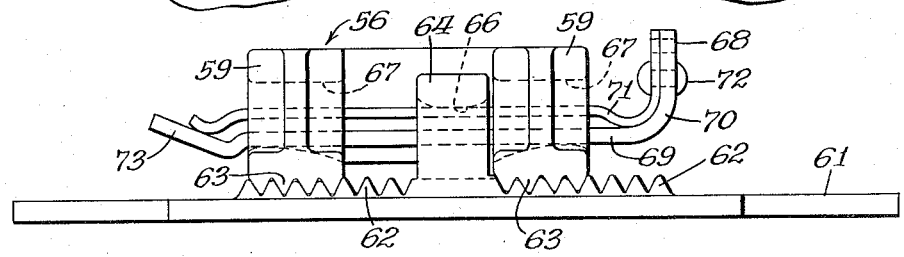
Figure 9 is an end elevational view illustrating the means employed for adjustably positioning and connecting the brake shoe to the end of a lever.
Figure 7:
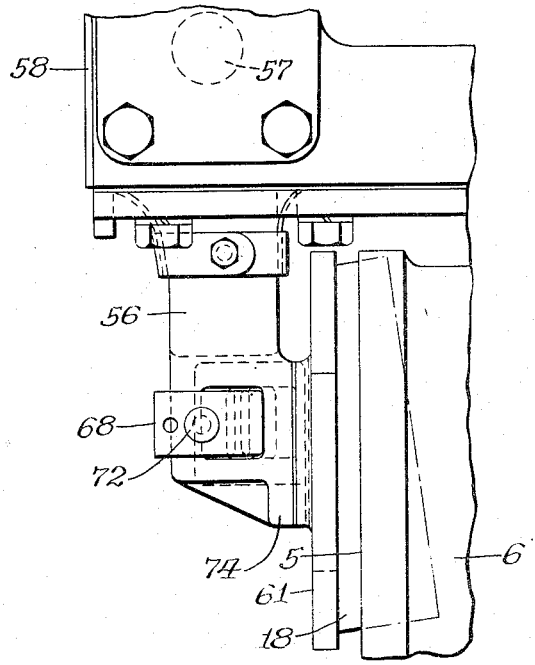
Figure 7 is a fragmentary top plan view illustrating another modified form of the present invention.

Referring now more particularly to Figures 7, 8 and 9 in the drawings, the disk brake is shown as comprising a brake lever 56 mounted for pivotal movement at 57 within a housing 58 and actuated by any suitable power means (not shown). The outer end of the brake lever 56 is bifurcated to provide a pair of arms 59—59 disposed in spaced parallel relation for abutting engagement with a brake head 61 to permit adjustment of the brake head 61 transversely of the brake lever 56, the brake head being formed along its outer surface with a plurality of corrugations 62 to receive and engage a plurality of corrugations 63 formed on the adjacent surfaces of the arms 59—59. A boss 64 is provided on the outer surface of the brake head 61 and formed with an aperture 66 disposed in registry with apertures 67—67 formed in the arms 59—59. A spring key 68 is mounted within the apertures 66 and 67—67 to tightly engage the brake head 61 against the brake lever arms 59—59. In this form of the invention the key 68 is shown as comprising a length of strip metal 69 having one end bent upwardly at 70 for fixed engagement with a resilient strip of spring metal 71. The strips 69 and 71 are secured together at one of their ends by means of a rivet 72, and the free end of the strip 70 is offset laterally at 73 toward the free end of the resilient strip 71 to hold the medial portions of the strips in spaced relation.

To provide larger abutment surfaces on the brake lever arms 59—59, flanges 74—74 are formed on the outer ends of the arms. The arms 59—59 thus have relatively large areas for abutting engagement with the brake head 61 to prevent tilting of the head relative to the brake lever 56. By providing corrugations on the brake head 61 and the brake lever arms 59—59, the brake head is adapted to be adjusted transversely of the brake lever to properly position the head with respect to the friction face 5 of a rotatable disk 6. A brake shoe 18 of the type heretofore shown and described is secured against the inner face of the brake head 61 by means of rivets and cement.

In each of the several forms of the invention thus shown and described it will be noted that the brake head is detachably secured in fixed position upon the end of a brake lever to prevent tilting movement of the brake head relative to the lever. In two forms of the invention it will be noted that the brake head is adapted to be adjustably positioned transversely of the brake lever in order to properly position the brake head with respect to the friction face of a rotatable disk.

As the surface speed of a rotatable disk increases from its axis toward its outer diameter, it is apparent that greater pressure should be applied to the portion of the brake shoe disposed closest to the axis of the rotor, in order to compensate for the greater surface speed at the periphery of the rotor, to thus equalize wear of the shoe radially of the rotor axis. In other types of disk brake apparatus, the brake head is usually pivotally connected to the free end of the brake lever, and, as a result, the portion of the brake shoe adjacent the periphery of the rotor is worn away much more quickly than the portion of the brake shoe closest to the axis of the rotor.

While this invention has been shown in several forms it is obvious to those skilled in this art that it is not so limited but is susceptible of various changes and modifications without departing from the spirit and scope of the claimed invention.

I claim:

1. In a disk brake, a brake lever, a brake head supported on said lever, resilient means to secure said brake head in fixed position on said lever, and means to vary the position of the brake head linearly transversely of the lever.

2. In a disk brake, a brake lever, a brake head supported on said lever, resilient means to secure said brake head in fixed position on said lever, means to vary the position of the brake head linearly transversely of the lever, and abutment means to prevent movement of the brake head longitudinally of the lever.

3. In a disk brake, a rotor rotatable on an axis, a brake lever, a brake head supported on said brake lever, said lever and head being formed with coacting abutting, corrugated surfaces disposed in tight contact engagement to prevent tilting of said head on said lever about an axis angularly related to the first mentioned axis, and means to maintain said coacting abutting surfaces in tight contact engagement.

4. In a disk brake, a rotor rotatable on an axis, a brake lever, a brake head supported on said brake lever, said lever and head being formed with coacting abutting, corrugated surfaces disposed in tight contact engagement to prevent tilting of said head on said lever about an axis angularly related to the first mentioned axis, and resilient means to maintain said coacting abutting surfaces in tight contact engagement.

5. In a disk brake, a brake lever, said lever having one of its ends bifurcated to provide a pair of arms disposed in spaced relation, a brake head engaged against said arms, a boss provided on said head and disposed between said arms, and resilient means to secure said boss to said arms, said arms and said head being engaged by coacting abutting corrugated surfaces disposed in tight contact engagement to prevent tilting of said head on said lever.

6. In a disk brake, a brake lever, said lever having one of its ends bifurcated to provide a pair of arms disposed in spaced relation, a brake head engaged against said arms, a boss provided on said head and disposed between said arms, and resilient means to secure said boss to said arms, said arms and said head being engaged by coacting abutting corrugated surfaces disposed in tight contact engagement to prevent tilting of said head on said lever, said resilient means comprising a strip of spring metal having its medial portion disposed within an aperture formed in said boss, the ends of said strip of metal being disposed in engagement with said arms.

References Cited in the file of this patent
UNITED STATES PATENTS

| | | |
|---|---|---|
| 369,461 | Messier | Sept. 6, 1887 |
| 573,523 | McLachlan | Dec. 22, 1896 |
| 1,199,932 | Schwentler | Oct. 3, 1916 |
| 2,004,842 | Wandell | June 11, 1935 |
| 2,291,016 | Aurien | July 28, 1942 |
| 2,355,123 | Tack et al. | Aug. 8, 1944 |
| 2,359,806 | Tack | Oct. 10, 1944 |
| 2,380,376 | Bachman | July 31, 1645 |
| 2,380,803 | Tack | July 31, 1945 |
| 2,431,774 | Schumacher | Dec. 2, 1947 |
| 2,438,481 | Tack | Mar. 23, 1948 |